United States Patent [19]
Gardner et al.

[11] 3,949,798
[45] Apr. 13, 1976

[54] PNEUMATIC TIRE
[75] Inventors: James Dennis Gardner, Akron; James Herbert Boettler, North Canton, both of Ohio
[73] Assignee: The Firestone Tire & Rubber Company, Akron, Ohio
[22] Filed: Apr. 23, 1974
[21] Appl. No.: 463,220

[52] U.S. Cl.......... 152/330 RF; 152/353 R; 152/354; 152/374
[51] Int. Cl.²...................... B60C 17/00; B60C 9/04
[58] Field of Search...... 152/330 R, 330 RF, 330 L, 152/352, 353, 354, 357, 360, 374

[56] References Cited
UNITED STATES PATENTS

| | | | |
|---|---|---|---|
| 2,482,221 | 9/1949 | Sokolik | 152/330 |
| 3,421,566 | 1/1969 | Sidles | 152/330 RF |
| 3,464,477 | 9/1969 | Verdier | 152/360 X |
| 3,486,547 | 12/1969 | Powers | 152/330 RF |
| 3,540,510 | 11/1970 | Smithkey | 152/330 |
| 3,542,108 | 11/1970 | Rye | 152/354 |
| 3,610,310 | 10/1971 | Wittneben | 152/330 RF |
| 3,841,375 | 10/1974 | Edwards | 152/353 |

*Primary Examiner*—Drayton E. Hoffman

[57] ABSTRACT

This disclosure relates to a pneumatic tire that is designed to be run-flat for a certain distance without destroying the remaining life of the tire as a result of injuries to the tire during its run-flat operation. The disclosure further relates to a combination of this tire with a special rim and internal lubricating means within the air chamber defined by the rim and tire. This combination further enhances the non-destructive run-flat characteristics of the tire.

8 Claims, 4 Drawing Figures

PNEUMATIC TIRE

BACKGROUND OF THE INVENTION

The novel tire construction and tire-rim combination of this invention is specifically designed to permit the tire to be run-flat for a certain period of time without destroying the remaining useful life in the tire. It has been determined that the primary reason for the destruction of a tire when it is run-flat or deflated is the movement which the tire undergoes in going from the undeflected shape to the deflected shape as the tire goes through the road surface contact point, the "footprint". The Applicants have found that the greatest damage is caused to a deflated tire by the movement of the deflated tire sidewalls just before and after the tire contacts the road surface. This movement takes the form of waves or wrinkles that are created in the sidewall area of the tire immediately before and after the tire engages the road surface.

The damage is further increased if the deflated tire becomes partially dislodged from the tire rim so that the rim is no longer centered over the tire, what is called a "flip-flop" condition. This condition may also exist with the tire remaining seated on the rim by the tire wobbling on the rim from side to side.

All of these above defined actions in the deflated tire and its sidewalls generate a great deal of heat and localized abrasion in certain areas of the tire. This heat and localized abrasion result in irreparable injury to the tire.

The construction of this invention eliminates or materially lessens these waves or wrinkles in the sidewall area; it maintains the deflated tire centered over the rim so the flip-flop and wobble conditions are eliminated. This invention provides a stable condition of the tire and rim when the tire is deflated and eliminates these major causes of tire destruction when the tire is run flat. This construction also provides a safe, easily controlled run-flat tire so that the driver may come to a safe stop and then continue to drive until he is out of danger or has reached a place to implement repair of the tire.

It has been determined that these waves exist in a bias tire and in a radial tire; although the waves appear to be less severe in the radial ply tire.

The demand for a tire which is capable of running flat without destroying its remaining life has intensified recently for two reasons. First, the realization that critical materials must be conserved and must fulfill their maximum useful lifetime, and secondly, the plan to eliminate the spare tire in new automobiles. The tire and tire-rim combination of this invention meet both of these objects.

SUMMARY OF THE INVENTION

The tire of this invention comprises a radial ply body with reinforcing belts in the crown or road-engaging area of the tire. These belts are located underneath the road-engaging tread surface of the tire. The radial ply body is comprised of one or more plies of reinforcing fabric in which all of the cords form an angle of substantially 90° to the circumferential centerline of the tire tread.

The section height-section width ratio of the tire (the aspect ratio) should be 70% or less. That is, the section height of the tire should be 70% or less than the section width of the tire. This type of construction yields a short radial length for the tire sidewall, thereby giving the tire a minimum amount of sidewall to be subject to flexing when the tire is run flat. Also the radial distance between the rim and road surface is minimized thereby lessening the changes in vehicle geometry when the tire is run flat.

The configuration of the lower sidewall of the tire at and near the point where the tire engages the rim flange should be of a cantilever or semi-cantilever shape. That is, the lower sidewall axially outwardly from the rim flange should extend in a direction substantially parallel to the axis of rotation of the tire or at an angle to the axis of rotation of the tire that doew not exceed 40°.

The tread width of the tire should be greater than the rim width of the rim upon which the tire is mounted.

The combination of the tire features set out above; that is, the low aspect ratio and resulting short sidewall distance, the cantilever or semi-cantilever configuration of the lower sidewall axially outwardly of the rim flange, the tire tread width being greater than the rim width, and the radial body construction, results in a tire construction wherein, when the tire is run deflated, the sidewalls are trapped axially outside the weight-bearing, point of contact area near the vertical plane containing a rim flange. This configuration of the tire results in a stable construction when the tire is run deflated.

The sidewall of the tire contains a heavy rubber insert located axially inwardly of the reinforcing plies and axially outwardly of the tire inner-liner. This insert is radially located between the tire bead area and the tread shoulder area in each sidewall. The location of the insert in the tire is critical. It must be in the area of compression of the sidewall when the tire is run flat so that the sidewall doesn't form a sharp bend in this condition. The insert lessens the degree of the bend and the movement that the deflected sidewall undergoes.

It may be located so that, when the tire is run flat, the portions of the tire which are in contact contain the insert. This feature is demonstrated by FIG. 2. This feature gives the tire a cushioned ride when it is run flat and serves to eliminate some of the frictional heat that is built up when the tire is run flat.

The insert is a relatively soft rubber compound having a Durometer hardness of less than 57 and a modulus at 300% elongation of less than 1,000 psi.

This insert gives the tire a relatively thick sidewall so that no severe hinge points are developed in the tire when the tire is run flat. Conventional tires develop such hinge points of severe flexing either in the upper sidewall near the tread shoulder or the lower sidewall near the rim flange when run flat. The tire of this invention has a smooth contour in both of these areas and in the middle portion of the sidewall.

The smooth contour of the sidewall of the tire when the tire is deflated and bearing the weight of the vehicle, may be defined as approximately one-half of a 45° ellipse. A 45° ellipse is the elliptical shape which is obtained by observing the shape of a circle which is rotated on its major axis from the horizontal plane to form an angle of 45° to the horizontal plane. The major axis of the ellipse must be at least 1.25 inches in order to obtain a contour smooth enough to provide run-flat life. The major axis of the ellipse is the longest longitudinal distance within the ellipse through the center point of the ellipse.

This smooth contour and the soft nature of the insert reduces the amount of flexing and hence the heat generated by the tire when it is run flat thereby facilitating its run-flat characteristics.

The tire of this invention is also provided with a lubricating fluid in the air chamber defined by the tire and rim. This lubricating fluid decreases the friction and abrasion that will occur between the contact points on the inner periphery of the tire when the tire is run flat. The lubricant should also have heat transfer properties to facilitate the removal and distribution of heat from the contact points and the areas of the sidewalls undergoing flexing.

The tire of this invention may also be provided with a sealant in its air chamber. This sealant may be in the form of a fluid in the air chamber of the tire or in the form of a strip of rubber located on the inner-liner of the tire in the crown area of the tire. Any of the several known methods of providing a ture with a lubricating fluid or a sealant material may be utilized with the tire of this invention.

The rim upon which the tire is mounted may contain annular safety ridges located axially inwardly of the tire bead. The tire bead is trapped between, on the one hand, the rim flange and, on the other hand, the safety ridge. This feature prohibits the tire bead from moving and coming loose when the tire is run in its deflated condition. The rim may also have flanges which have axially outward extensions, rim curls. These axially outward extensions of the flanges provide the lower sidewall area of the tire which is axially outward of the bead with support when the tire is run flat.

DETAILS OF THE INVENTION

Figure 1:
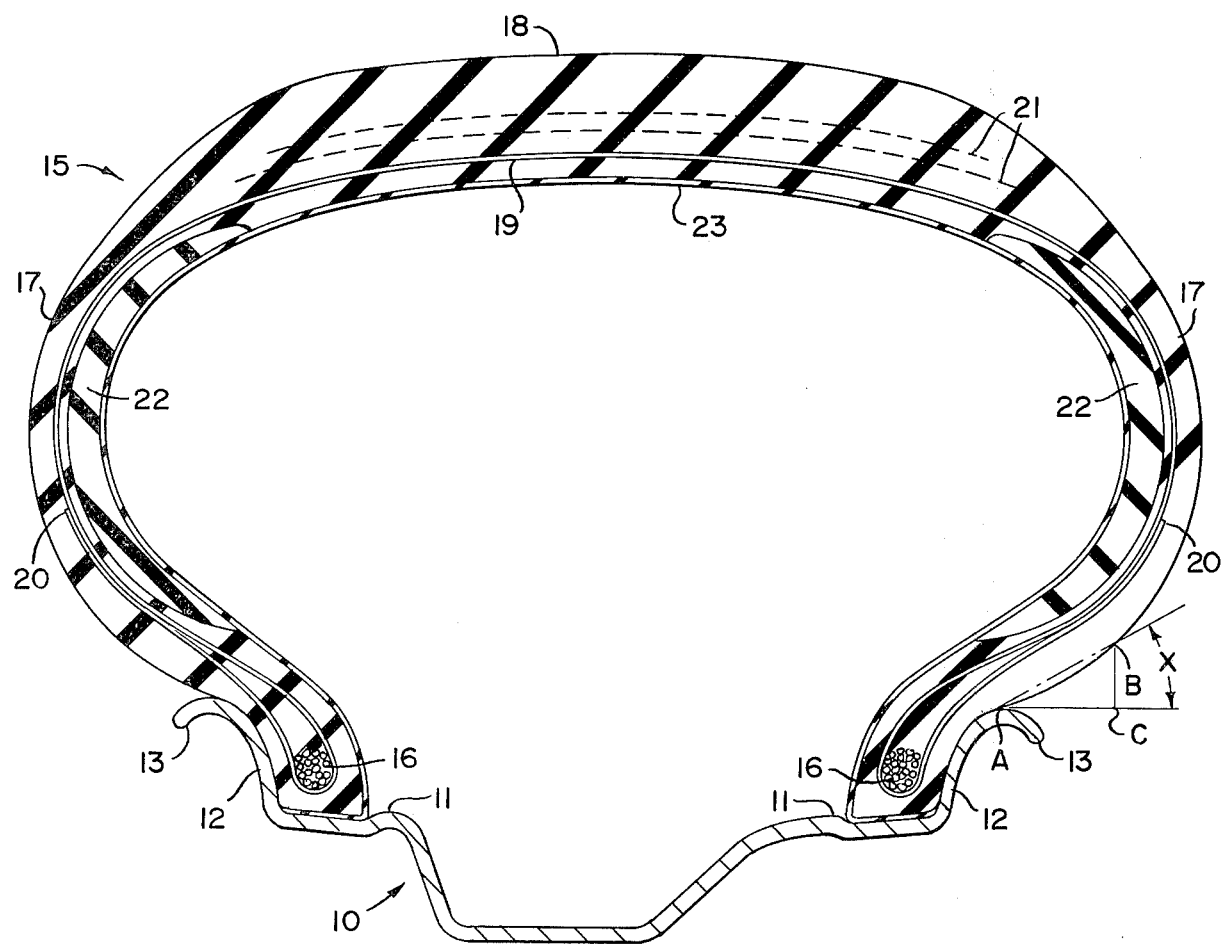
FIG. 1 is a cross-sectional view of the tire of this invention mounted on the tire rim described in this specification.

Referring to FIG. 1, the tire, 15, is shown mounted on rim 10. The rim contains annular safety ridges, 11, rim flanges, 12, and rim flange curls, 13.

The tire, 15, is comprised of annular beads, 16, sidewalls, 17, and the road-engaging tread surface, 18. The body of the tire is of the radial type construction; that is, all of the reinforcing cords in the body plies form an angle of approximately 90° to the circumferential centerline of the tire tread. FIG. 1 depicts the tire of this invention having one body ply, 19. It is understood that the tire of this invention may contain one or a plurality of body plies. The end of the body ply, 20, that is wrapped around the bead is located in the middle sidewall a sufficient distance from the bead to give the lower area of the sidewall two layers of reinforcing fabric.

The tire of this invention contains a tread ply belt comprising two or more fabric reinforcing plies, 21. It is understood that the tread ply belt may contain any of the known materials and constructions that are used in the tread ply belt of radial tires. These materials, for example, are steel, glass, Kelvar, nylon or rayon or any combinations of these materials. The reinforcing cords in the tread ply belt form an angle with the circumferential tread centerline of the tire which is less than 30°.

The sidewalls of the tire contain inserts, 22, located inside of the body ply between the body ply and the inner-liner, 23. This insert is a soft, low modulus, high rebound, low-running temperature rubber compound having a Durometer hardness of less than 57 and preferably between 57 and 50, a modulus of less than 1000 at 300% elongation and preferably between 500 and 1,000, a running temperature on the order of 160° F. and a deflection on the order of 22.7% when tested under ASTM specification D-623 (Firestone Method B), and a rebound on the order of 80% at 212° F. when tested under ASTM procedure D-2632. This rubber compound which comprises the sidewall inserts may be manufactured by any of the known methods and may contain any of the known materials to obtain these properties. This sidewall insert is placed so that it is located in the entire sidewall area which undergoes compression when the tire is run flat. The above physical properties of the insert are important to withstand the compression cycles of the sidewall without degrading the insert and generating too much heat to degrade the fabric in the sidewall.

The insert may be of sufficient length so that it will be present in both areas of the sidewalls that are in frictional contact when the tire is run flat.

The section height-section width ratio of the tire should be such that the tire is of the low profile type. The Applicants have found that the tire should have a section height-section width ratio of 70% or less. This means that the inflated section height, as measured from the radially outmost point of the tread to the line defined by the two radially innermost points of the bead area of the tire, should be 70% or less of the inflated section width of the tire, the axial distance between the maximum point on each tire sidewall. This low profile type construction results in a short radial distance between the bead and the road-engaging tread surface. This short radial sidewall distance facilitates the run-flat characteristics of the tire.

The Applicants have found that the tire of this construction must have a cantilever or semi-cantilever shape in the lower sidewall immediately adjacent the rim flange. Referring to FIG. 1, the angle "X" must be 40° or less for the tire of this invention to obtain its maximum effectiveness. This angle is defined by the line AC and the line BC in FIG. 1. The line AC is the line parallel to the axis of rotation of the tire at the point where the lower sidewall of the tire last contacts the flange (point A in FIG. 1). The line AB is defined by point A in FIG. 1 and point B. Point B is the point on the lower sidewall of the tire where a line perpendicular to line AC intersects the sidewall of the tire. This perpendicular line, BC in FIG. 1, is located axially outwardly from point A at a distance of 10% of the section width of the tire.

The tire of this invention is mounted on the rim so that the beads, 16, are seated between the safety ridges, 11, and the rim flanges, 12. This construction traps the beads between the flanges and the safety ridges of the rim so that the beads will not be dislodged when the tire is run flat. The rim flanges are also provided with axially outwardly extending portions, the rim curls, 13, which give some support for the lower sidewall areas of the tire when the tire is run flat.

Figure 2:
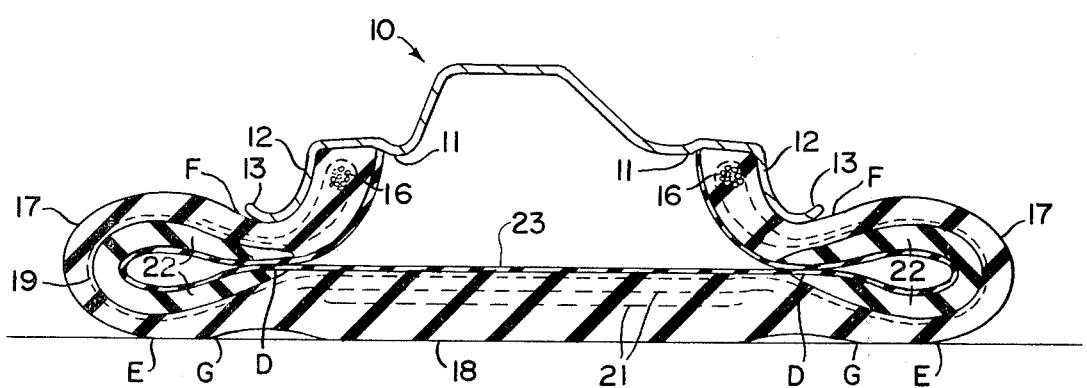
FIG. 2 is the tire of FIG. 1 in a deflated condition carrying the load of the vehicle.

FIG. 2 demonstrates the cross-sectional shape of the tire and rim of this invention when the tire is deflated and carrying the load. It is this configuration that is critical to this invention. This configuration gives the tire of this invention its excellent run-flat characteristics so that the tire may be run a substantial distance without damage, thereby retaining its remaining useful life. Also, this configuration gives the tire of this invention a stable run-flat configuration so that control of the vehicle may be maintained when the vehicle is run with the tire flat.

Referring to FIG. 2, the tire of FIG. 1 is depicted in its run-flat configuration. FIG. 2 discloses all of the features of FIG. 1 and demonstrates how these features interact to obtain the novel tire and rim combination of this invention. Referring to FIG. 2 the weight bearing portions of the deflated tire are depicted at D. These points represent the contact points where the inner periphery of the tire near the bead area contacts the inner periphery of the tire near the tread shoulder area. A feature of this invention is that the rubber sidewall insert may be contained in both of these contact areas. This enables the tire to generate less heat when it is run flat.

The configuration set out in FIG. 2 demonstrates the stability of the tire of this invention in its run-flat condition. The sidewalls, 17, are trapped axially outwardly of the radial planes defined by the rim flanges and the contact points D. Due to the interaction of the short sidewall length, the tread width being greater than the rim width and the sidewall insert, the sidewalls, 17, will remain trapped axially outside of the tire rim and will not move axially. This interaction is further facilitated by the stable nature of the bead attachment to the rim. This stability is obtained by trapping the beads between the safety ridges of the rim and the rim flanges.

The run-flat stability is further enhanced by the fact that in this construction the sidewalls independently contact the road surface axially outwardly of the vertical plane of the rim flanges and the contact point D. These independent contact points which are separated from these planes by areas where the tire doesn't touch the road act as stabilizers, for the tire when it is run-flat. These points are shown as E in FIG. 2.

The outer periphery of the sidewall of the deflated tire is defined as the outer periphery from the point F to the point G in FIG. 2 and may be represented as a 45° ellipse. This is a result of the interaction of the features of the tire of this invention. This 45° ellipse eliminates the wrinkles or waves that occur in previous constructions in the lower sidewall area of the tire both immediately before and immediately after the tire engages the road or passes through the "footprint" area. This smooth contour of the tire sidewall and the elimination of these waves or wrinkles is a critical feature of the interaction of the combination of this invention.

Figure 3:
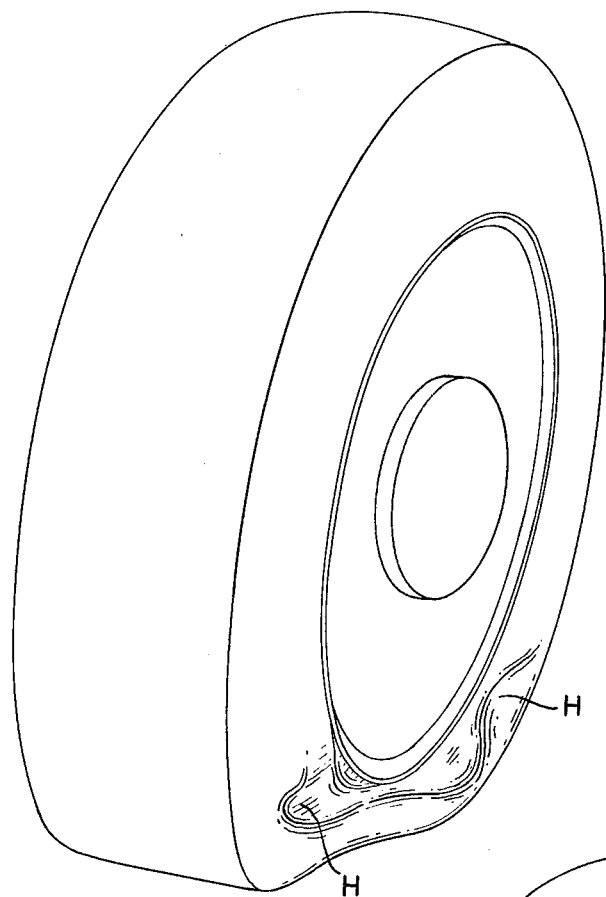
FIG. 3 depicts the prior art tire in its run-flat condition; that is, deflated and carrying the load of the vehicle.
Figure 4:
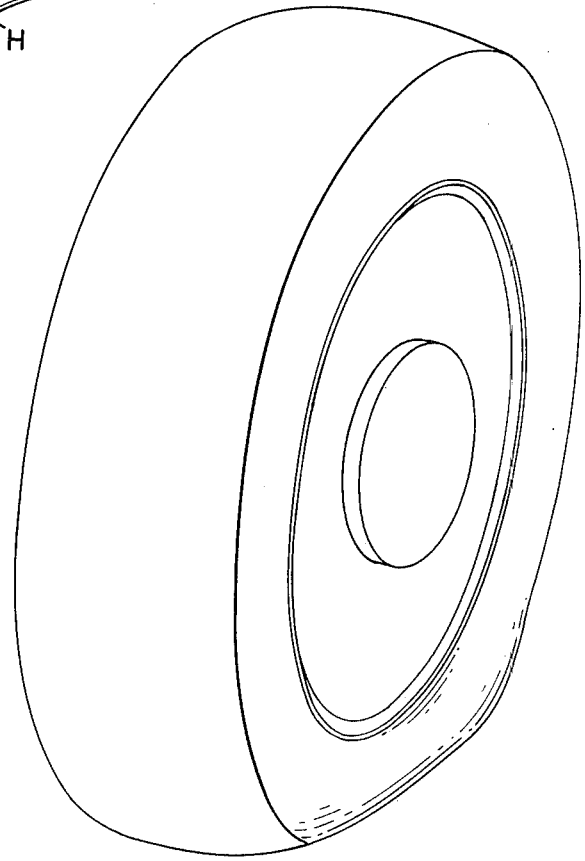
FIG. 4 depicts the tire of this invention in its run-flat condition; that is, deflated and carrying the load of the vehicle.

These waves or wrinkles in the previous tire and the elimination thereof by the interaction of the tire construction of this invention is demonstrated by reference to FIGS. 3 and 4 of this application. FIG. 3 shows the run-flat configuration of a belted-bias tire. The wrinkles the Applicants have mentioned are depicted at points H in FIG. 3. These wrinkles are in the lower sidewall area of the tire and result in a great deal of movement of the tire tread surface and sidewalls when the tire is run flat. This movement generates high amounts of heat and causes damage to the tire itself.

FIG. 4 depicts the tire of this invention in its run-flat configuration. The tire of this invention does not contain the waves or wrinkles that are present in FIG. 3. The contour of the sidewall is smooth in the areas immediately before and immediately after the tire contacts the road surface. This smooth contour of the sidewall causes less heat to be generated and less movement of the tire when it is run flat thereby preserving the remaining life of the tire and eliminating damage to the tire.

The Applicants have run extensive tests on the tire and rim combinations of this invention with significant success. The Applicants have driven the tires of this invention up to 100 miles in a flat condition at speeds up to 60 miles per hour without structural damage to the tire. The speed at which the Applicants were able to run the tires for this distance demonstrates the stable run-flat construction of the tire of this invention. The Applicants have run flat tires embodying this invention up to 275 miles at 50–55 miles per hour while still maintaining excellent stability and handling.

A specific embodiment of this invention which the Applicants have tested as indicated above is a BR60C-14 size tire. This tire had a section height-section width ratio of 66%, a tread width of 5.0 inches and a rim width of 4.5 inches. The angle X as defined in FIG. 1 was 35°. The sidewall insert was a rubber compound with a Durometer of 53 and a modulus of 1000 psi at 300 elongation. The body construction comprised two plies of 840/2 nylon having 26 cords per inch. The tread ply construction was a standard radial construction having two plies of steel cord forming an angle of 22° to the circumferential tread centerline and having 18 cords per inch. The rim containing the safety ridges and the flange curls.

It is understood that the tire of this invention should contain a lubricant in its air chamber to further eliminate the friction between the contacting surfaces on the inner periphery of the tire when the tire is run flat and to dissipate the heat generated when the tire is run flat. This lubricant may be any of the known tire lubricants which exhibit the properties and may be applied in any of the known ways.

The Applicants have obtained the excellent run-flat features and run-flat stability in the tire of this invention while still maintaining acceptable inflated ride, handling and endurance characteristic in the tires.

The tire of this invention, while specifically designed for passenger car tires, can be applied to truck, tractor, or any other type of tire in which a pneumatic tire is presently being used.

It is also contemplated that the tire could be "cordless"; that is, having no reinforcing fabric in the body. Tires of this type are known and are usually made by cast molding materials, such as polyurethanes.

We claim:

1. A radial ply pneumatic tire construction having a stable, flex-resistant run-flat configuration, when said tire is run deflated carrying the vehicle load, that gives said tire the capability of being run-flat for a specified distance without injuring the remaining useful life of the tire, wherein said tire comprises an annular road-engaging tread, two sidewalls, each connecting a lateral side of said tread to an annular bead, a body containing at least one fabric reinforcing ply extending from one bead to the other through the sidewalls and tread area of said tire, and an inner-liner covering the entire inner periphery of said tire, said tread having a width greater than the rim width of the rim said tire is designed to be mounted on, said tire having a low profile in which its inflated section height is 70% or less of its inflated section width, said sidewalls having rubber inserts located between the axially innermost body reinforcing ply and the inner-liner in the area of the sidewalls which is in compression when the tire is run-flat, said inserts located in the sidewalls at the points where the inner periphery of the tire contacts itself when the tire is run flat so that said inserts abut themselves when the tire is run-flat, said inserts being axially separated from each other in the tread area of the tire and continuous within each sidewall between said tire contact points for each sidewall, said sidewalls forming an angle of 40° or less as measured from a line parallel to the axis of rotation of the tire through the point where the tire sidewall last contacts the rim flange to the line defined by said last contact point and a point on said sidewall defined by the intersection of said sidewall and a line perpendicular to said axis of rotation located axially outwardly from said last contact point a distance of 10% of said tire section width, the outer periphery of the sidewalls of said tire when the tire is run-flat having a smooth, substantially wrinkle-free configuration in the area of said sidewalls immediately before and after the tire contacts the road surface, thereby lessening the movement and heat generation in the said tire when it is run flat.

2. The tire of claim 1 wherein said sidewall inserts are comprised of a soft, low modulus rubber compound having a Durometer hardness between 50 and 57 and a modulus between 500 and 1,000 psi when measured at 300% elongation.

3. The tire of claim 1 wherein the outer periphery of said sidewalls in the road contact area of the tire when the tire is run-flat have a configuration of approximately one-half of a 45° ellipse, said ellipse having a major axis of at least 1.25 inches.

4. The tire of claim 1 in which said sidewalls are trapped outside the vertical load bearing planes defined by the rim flanges when said tire is run flat.

5. In combination, a tire and rim wherein said combination has a stable, flex-resistant run-flat configuration which enables the combination to be run with the tire deflated and carrying the load of the vehicle for certain distances without injuring the tire and decreasing its remaining life, said tire being a radial ply pneumatic tire comprising an annular road-engaging tread, two sidewalls, each connecting a lateral side of said tire to an annular bead, a body containing at least one fabric reinforcing ply extending from one bead to the other through the sidewalls and tread area of said tire, and an innerliner covering the entire inner periphery of said tire, said tread having a width greater than the rim width of said rim, said tire having a low profile in which its inflated section height is 70% or less of its inflated section width, said tire sidewalls having rubber inserts located between the axially innermost body reinforcing ply and the innerliner in the area of said sidewalls which are in compression when said tire is run-flat, said inserts located in the sidewalls to cover the points where the inner periphery of the tire contacts itself when the tire is run-flat so that said inserts abut themselves when the tire is run-flat, said inserts being axially separated in the tread area of the tire and continuous within each sidewall between said tire contact points for each sidewall, said tire sidewalls forming an angle of 40° or less as measured from a line parallel to the axis of rotation of the tire through the point where the tire sidewall last contacts the rim flange to the line defined by said last contact point and a point on said sidewall defined by the intersection of said sidewall and a line perpendicular to said axis of rotation located axially outwardly from said last contact point a distance of 10% of said tire section width, the outer periphery of said sidewalls of said tire when the tire is run-flat having a smooth, substantially wrinkle-free configuration in the area of said sidewalls immediately before and after the tire contacts the road surface.

6. The combination of claim 5 wherein said sidewall inserts are comprised of a soft, low modulus rubber compound having a Durometer hardness between 50 and 57 and a modulus between 500 and 1,000 psi when measured at 300% elongation.

7. The combination of claim 5 wherein the outer periphery of the sidewalls in the road contact area of the tire when the tire is run-flat have a configuration of approximately one-half of a 45° ellipse, said ellipse having a major axis of at least 1.25 inches.

8. The tire of claim 5 in which said sidewalls are trapped outside the vertical load bearing planes defined by the rim flanges when said tire is run flat.

* * * * *

UNITED STATES PATENT OFFICE
CERTIFICATE OF CORRECTION

Patent No. 3,949,798          Dated April 13, 1976

Inventor(s) James Dennis Gardner & James Herbert Boettler

It is certified that error appears in the above-identified patent and that said Letters Patent are hereby corrected as shown below:

Column 2, line 13 - "doew" should read --does--;

Column 3, line 17 - "providing a ture" should read --providing a tire--;

Column 3, line 61 - "reinforcing" should read --reinforced--.

Signed and Sealed this

Sixth Day of July 1976

[SEAL]

Attest:

RUTH C. MASON
*Attesting Officer*

C. MARSHALL DANN
*Commissioner of Patents and Trademarks*